US005346749A

United States Patent [19]

Bettinelli

[11] Patent Number: 5,346,749

[45] Date of Patent: Sep. 13, 1994

[54] PROCESS FOR OBTAINING INSULATING CERAMIC INSERTS BY MULTILAYER STACKING

[75] Inventor: Armand Bettinelli, St Paul les trois châteaux, France

[73] Assignee: N-Xeram, Bollene Cedex, France

[21] Appl. No.: 38,599

[22] Filed: Mar. 23, 1993

[30] Foreign Application Priority Data

Mar. 23, 1992 [FR] France ........................ 92/04257

[51] Int. Cl.[5] ........................ B32B 09/00

[52] U.S. Cl. ........................ 428/209; 428/901; 428/210; 264/58; 264/61; 264/67

[58] Field of Search ........................ 428/901, 209, 195, 688, 428/689, 210; 156/89, 901, 250, 252; 264/56, 58, 61, 65, 62, 67; 29/848

[56] References Cited

U.S. PATENT DOCUMENTS

| | | | |
|---|---|---|---|
| 4,661,181 | 4/1987 | Camps et al. | 156/89 |
| 4,710,250 | 12/1987 | Kojima et al. | 156/89 |
| 4,766,671 | 8/1988 | Utsumi et al. | 156/89 |
| 4,775,503 | 10/1988 | Dubuisson | 264/61 |
| 4,830,704 | 5/1989 | Voss et al. | 156/629 |
| 5,071,509 | 12/1991 | Kano et al. | 156/901 |

FOREIGN PATENT DOCUMENTS

| | | | |
|---|---|---|---|
| 1615033 | 5/1970 | Fed. Rep. of Germany . | |
| 2157388 | 5/1973 | Fed. Rep. of Germany . | |
| 942907 | 2/1949 | France . | |
| 1485221 | 6/1967 | France . | |
| 2585181 | 1/1987 | France . | |
| 67582 | 11/1979 | Japan | 156/89 |

*Primary Examiner*—Patrick J. Ryan
*Assistant Examiner*—Patrick Jewik
*Attorney, Agent, or Firm*—Millen, White, Zelano & Branigan

[57] ABSTRACT

A process for manufacturing insulating ceramic inserts used as sealed passages for electrical conductors through a metallic wall, is described wherein a green ceramic plate is subjected to silk-screen printing with the aid of a conducting ink, generally in ring-shaped patterns. The patterns are pressed and holes are pierced through the center of the ring and through at least one other green plate. The silk-screen printed plate is pressed against the at least one other green plate, or between two other green plates, bringing the holes into coincidence. A cut-out is made around each of the holes and the outer lateral surface of the part obtained is metallized. The part is then heat treated in order to fire and sinter same. It also is possible for the sintering to be performed before the metallization of the outer lateral surface.

31 Claims, 3 Drawing Sheets

PROCESS FOR OBTAINING INSULATING CERAMIC INSERTS BY MULTILAYER STACKING

TECHNICAL FIELD

The invention relates to a process for obtaining insulating ceramic inserts (for example beads) as a sealed passage for electrically-conducting wires or pins through an electrically-conducting, generally metallic, wall.

STATE OF THE ART

Insulating ceramic beads are generally in the form of cylindrical parts which include an axial bore. The external lateral wall of the ceramic part and that of the axial bore are metallized separately from each other. Thus, it is possible to braze the external surface on the metallic wall to be penetrated and to braze the conducting wire inside the bead, so as finally to obtain an electrical passage which is hermetically sealed and electrically insulated from the metallic wall.

Ceramic beads are normally obtained by conventional sintering techniques. In this case, a ceramic powder, containing a binder and a plasticizer, is shaped by pressing in order to obtain a green part which may subsequently be either sintered by known techniques, and then either partly metallized, separately over the external lateral surface and in the axial bore, or completely metallized, it then being necessary to lap the ends of the bead in order to insulate electrically from each other the lateral surface and the axial passage, or metallized on the green body, partially or completely as previously, and then sintered, the metallization then being fired and cosintered with the ceramic.

FIGS. 1A–1D illustrates such a process of the prior art:

(1) represents the bead shaped with its external lateral wall (2), the axial passage (3) including, for example, a central cylindrical portion (3*a*) terminated at each end by a flaring (3*b*); (4) represents the plane ends of the bead; FIG. 1B represents the partly metallized bead with the metallization layer of the lateral surface (6) and that of the axial bore (7*b*), which layers are separated from each other by the non-metallized end surfaces (4). The completely metallized bead is represented at FIG. 1C; this bead then undergoes a lapping operation intended to remove the metallization on the end faces (4) so as to obtain a bead as in FIG. 1B identical to the bead (5) where the metallization of the lateral surface (6, 10) is insulated from that of the axial bore (7, 11).

The metallization is generally carried out with the aid of metallization inks or pastes having a rheology adapted to the ceramic material and to the device for depositing the ink or paste.

Such a type of process where the beads are individually shaped is long and not very productive. In addition, with such beads, frequent hermetricity defects are observed after having performed the brazing operation on the electrically-conducting wire in the axial bore, generally on the metallized flaring (7*b*, 11*b*). Moreover, the isolating distance separating the metallization layers of the lateral surface (6, 10) and the axial bore (7, 11) is limited to the non-metallized plane end surfaces (4). This isolating distance directly affects the current losses and the risks of electrical arcing between these two metallized surfaces (6, 10) and (7, 11); it is often insufficient and limits the use electrical voltage of the beads. In addition, it is very difficult by this process to obtain hermetically-sealed insulating inserts having any shape and including a plurality of metallized bores (3) such as at FIG. 1B or FIG. 1C, corresponding to as many hermetically-sealed electrical-lead passages.

Faced with these problems, the assignee has sought a process for manufacturing beads, or more generally insulating inserts of any shape, which is more productive, also enabling scrap by loss of hermetricity at the site of the brazing of the wire penetrating the bead to be avoided and the breakdown voltage between the wire and the metallic wall, in which the bead is brazed, to be increased without increasing the size of the bead.

BRIEF DESCRIPTION OF THE DRAWINGS

FIG. 2A is a cross sectional view of layered ceramic sheets. FIGS. 2B–2H are cross sectional views of sequential processing steps used to make the present invention which includes green sheets with co-axial cylindrical bores of different diameters.

DESCRIPTION OF THE INVENTION

The invention is a process for manufacturing insulating ceramic inserts (parts or beads) which include a ceramic body defined by two plane end faces, an external lateral surface of any shape and at least one bore joining the two end faces, the said parts or beads being used as hermetically-sealed insulating passages for at least one electrically-conducting wire or pin through a wall which is also electrically conducting. This process is characterized in that at least two plane sheets are cast from a slip of insulating ceramic powder in order to obtain at least two green sheets, ring-shaped patterns are silk-screen printed on at least one face of one of the sheets with the aid of a conducting metallization ink or paste, a pressing operation is performed on the silk-screen printed sheet and then a punching operation is performed on all the sheets in order to obtain a plurality of holes (corresponding to as many bores), the holes of the silk-screen printed sheet matching the interior of the ring and having a diameter less than that of the holes of the other sheets, the various sheets are stacked by bringing into coincidence the axes of the various holes, thereby obtaining the bores, a pressing operation is carried out in order to agglomerate the sheets, a cutting-out operation is performed around at least one bore in order to obtain the external lateral surface of desired shape and thus to fabricate green parts or beads, the green parts or beads are metallized either solely on their external lateral surface or completely, and in this case, a lapping operation is then performed thereon in order to remove the metallization from the end faces, and then a heat treatment is carried out in order to fire and sinter.

FIG. 2 is an illustration of the invention which will enable it to be better understood. At FIG. 2A, the references 1, 2 and 3 represent green sheets cast, for example, from a slip typically comprising a 94 to 96% pure alumina powder, a binder and a plasticizer, according to the techniques known to the person skilled in the art. Each of these sheets may be made up of a stack of elementary sheets.

The sheet (2) which, as will be seen later, includes the cylindrical portion of the axial bore and the silk-screen printed patterns, may be advantageously thicker than the others.

Figure 1A:
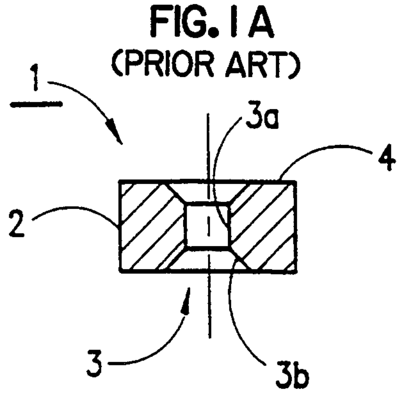
FIG. 1A (PRIOR ART)
FIGS. 1A–1D are plan views of prior art embodiments.
Figure 1B:
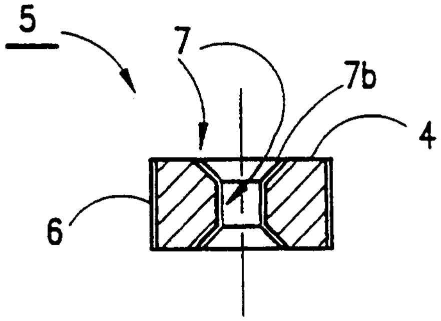
Figure 1C:
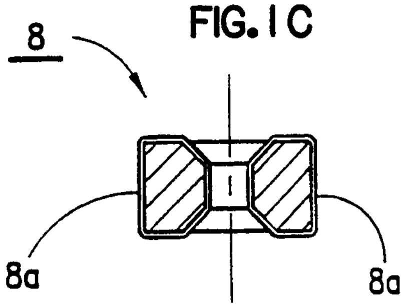
Figure 1D:
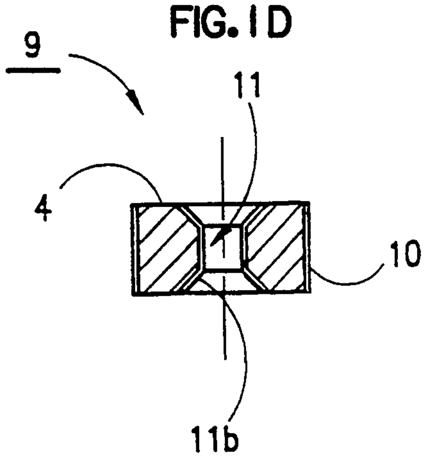
Figure 2A:
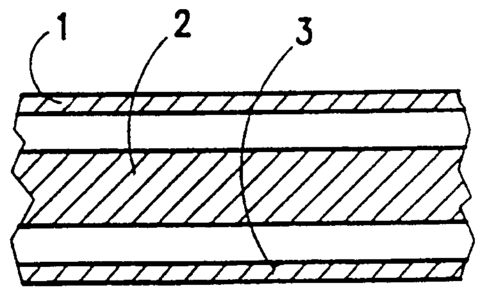
FIGS. 2A–2H are a cross sectional views of the present invention.
Figure 2B:
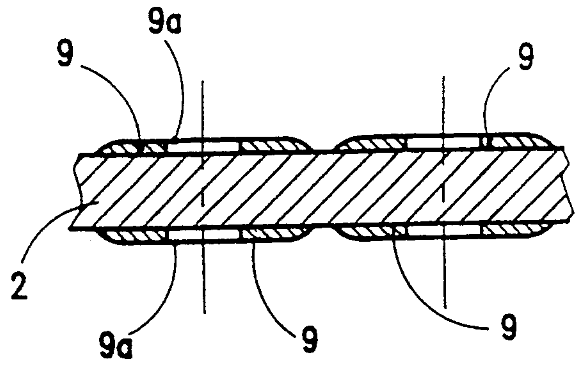

At FIG. 2B, patterns (9) corresponding to the bores of the future beads have been silk-screen printed on each of the faces of the sheet (2) with the aid of a metallic ink or paste (adapted to the ceramic support and to the subsequent brazing operations performed on the metallized surfaces). These patterns are generally circular rings, the inner circle (9*a*) of which has a diameter not exceeding that of the cylindrical portion of the bore.

It is possible to silk-screen print only one of the faces of the sheet (2), in order to obtain a half-bead, for example; it is this face which will come into contact with a non-silk-screen printed sheet, as will be seen hereinafter.

When these patterns are silk-screen printed on each of the two faces, they are located in pairs on the same axis.

The silk-screen printed sheet is then subjected to a pressing operation in order to optimize the adhesion of the metallic paste on the green ceramic.

Figure 2C:
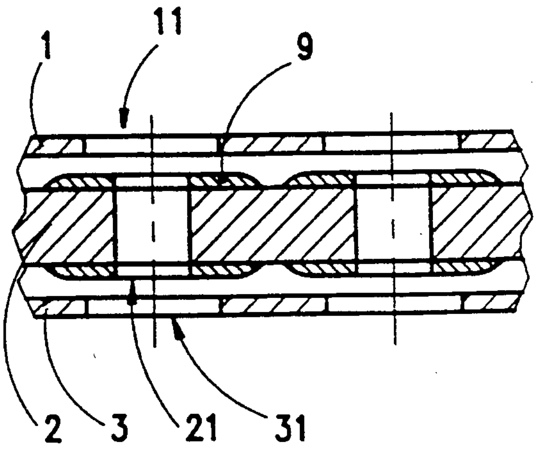

At FIG. 2C, it may be seen that a punching operation has subsequently been carried out on each of the sheets (1), (2), (3) in order to obtain a plurality of holes (11, 21, 31) which will make up the bores (4) located at the center of the beads. The holes (11, 31) made in the non-silk-screen printed sheets have a diameter greater than that of the hole (21) made in the silk-screen printed sheet. It may also be seen that the sheets (1), (2), (3) have been positioned so as to superpose the axes of the holes (11), (21), (31).

Figure 2D:
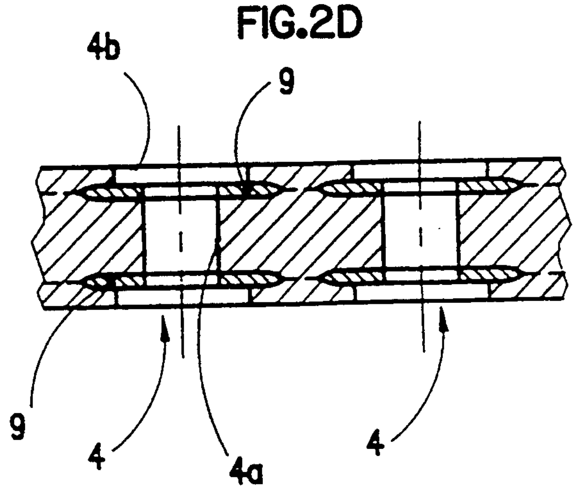

The sheets are then brought into contact and pressed against each other in order to obtain a green monolith as illustrated at FIG. 2D, where the axial bores of the future beads are visible, the bores comprising an insulating ceramic cylindrical portion (4*a*) continued at its two ends by the metallized shoulders (9) and by wider openings (4*b*) following them.

The silk-screen printed sheet comprising the cylindrical portion of the bore is thus clipped between the two non-silk-screen printed sheets forming the end faces and comprising the openings. Normally the non-silk-screen printed sheets partly overlap the metallized shoulders (9).

Figure 2E:
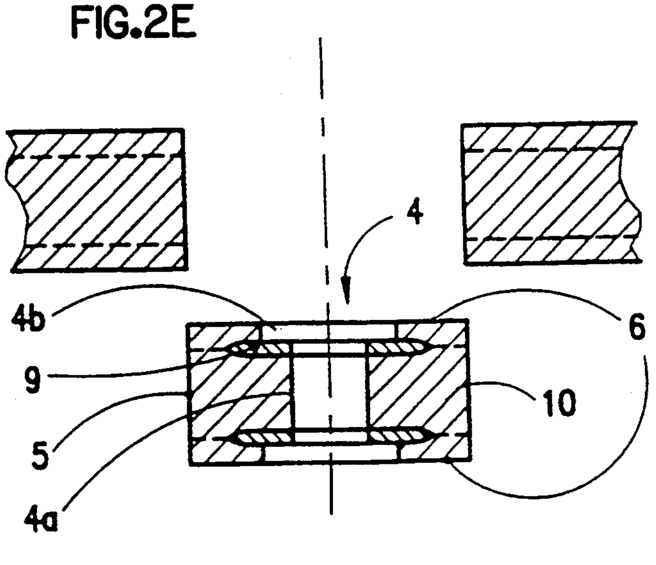

At FIG. 2E, there is shown the cut-out produced around an axial bore in order to obtain the external lateral surface (5), of any shape, of the parts or beads; the ceramic body (10) of the parts or beads has, at this stage, acquired its final shape. The cut-out can encompass one or more bores; it can have any shape. For example, when it only encompasses one bore, it may be circular and coaxial with the bore in order to obtain a bead; it may be rectangular and encompass a row of bores in order to obtain, finally, an insulating insert which includes as many hermetically-sealed electrical passages (for wires or pins), it being possible for the insert to make up a portion of an encapsulation module.

It is observed that whether in the case of a bead having a single bore or in the case where the cut-out encompasses several bores:

- the bore (4) comprising generally, as has already been seen, the ceramic cylindrical central portion (4*a*), the metallized shoulder (9), on which the conducting wire or pin penetrating the part or bead will be brazed, and the ceramic opening (4*b*) (of diameter greater than that of the cylindrical portion (4*a*)) making it possible to have access to the metallized shoulder (9) where the subsequent brazing of the conducting wire or pin will be performed;
- the external lateral surface (5) which will enable, after metallization, the part or bead to be fixed in the wall to be penetrated;
- the plane end faces (6), corresponding to the cast sheets (1) and (3).

Thereafter, it is preferable to perform, first of all, the metallization of the lateral surface (5) of the green bead and then to fire and sinter, so that the metallic ink and the ceramic are cosintered, which improves their mutual adhesion.

Figure 2F:
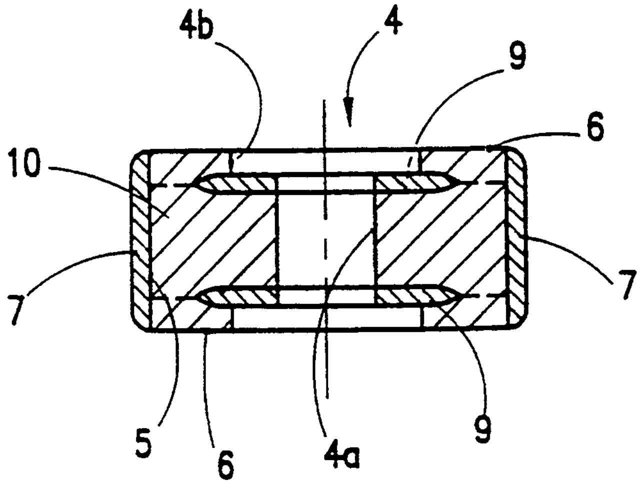

Thus, there is shown, at FIG. 2F, the selective metallization (7) of the lateral surface (5) made, for example, with the aid of a metallic ink or paste by the methods known to the person skilled in the art, after which it then remains only to perform the firing and sintering heat treatment in order to obtain the final insert (single-bore bead or parts of any shape which may contain several bores).

Figure 2G:
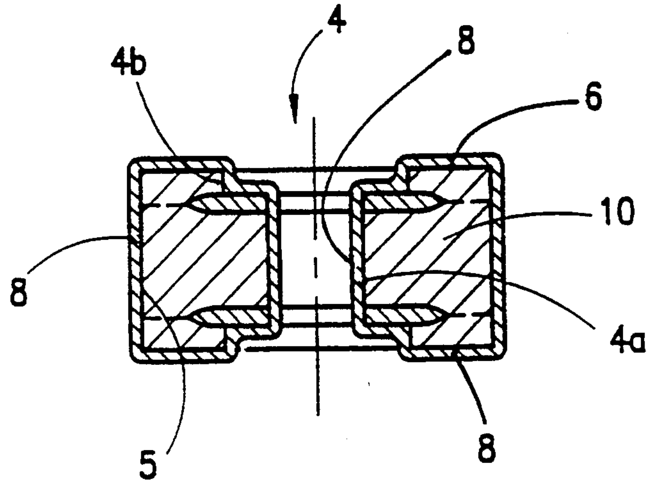
Figure 2H:
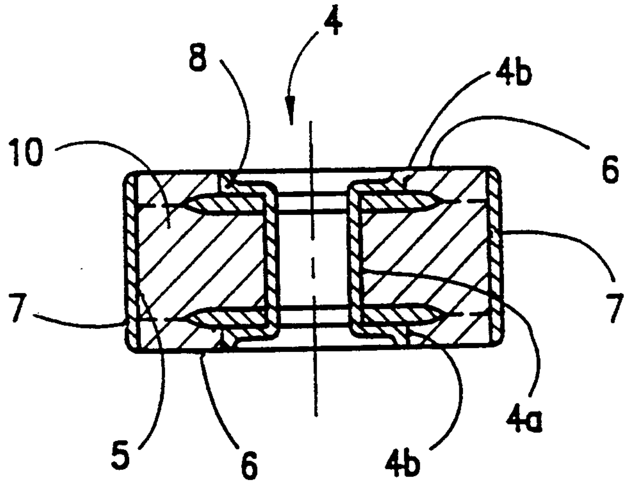

It is also possible, as illustrated at FIG. 2G, to perform a complete metallization (8) of the green ceramic part, for example by simple immersion in a metallic ink or paste according to the techniques known to the person skilled in the art followed, at (G2), by a lapping operation on the end faces (6) in order to remove the deposited metal therefrom and thus to insulate the metallization (7) of the lateral surface (5) electrically from the metallization (8) of the bore (4) and to obtain a metallized bead similar to that of the case illustrated at (F), except for this difference that, in the case FIG. 2H, the cylindrical portion (4*a*) of the bore (4) as well as the vertical portion of the opening (4*b*) are metallized.

However, it is also possible, after having obtained the green bead such as at FIG. 2F, to first perform the firing and sintering heat treatment which is then followed by the complementary metallization such as performed at FIG. 2F or 2G, according to the techniques known to the person skilled in the art which may, in particular, include a treatment for firing the metallization inks or pastes.

With the aid of the process according to the invention, it is possible, as has already been stated, to obtain half-parts or half-beads of different appearance to those of FIGS. 2A–2H by silk-screen printing only the upper face of the sheet (2), the final bead obtained then possessing only a single metallized shoulder (9) and to stack only the sheets (1) and (2), one of the end faces being made up by the non-metallized lower face of the sheet (2).

A ceramic insulating part or bead according to the invention therefore includes a sintered ceramic body (10), two non-metallized end faces (6), an external lateral surface (5) which is metallized (7) and of any shape, at least one bore (4) connecting the two end faces (6), which bore includes a cylindrical central portion (4*a*), preferably non-metallized, at least one metallized shoulder (9), on which an electrical conductor penetrating the part or bead will be brazed in an hermetically-sealed manner, and at least one ceramic opening, generally non-metallized, giving access to the shoulder. This opening, giving access to the shoulder and to the cylindrical portion, is defined by one of the end faces (6) of the bead, and the vertical cylindrical wall (4*b*).

With the process according to the invention, it is easy for this wall (4*b*) to be obtained non-metallized, which has an undeniable advantage. Indeed, the fact that it is not metallized increases the isolating distance separating the metallized shoulder (9) from the metallized external surface (7), which will lead to a reduction in the leakage currents and to a significant increase in the breakdown voltage between these two metallized portions which are intended to be brought to different potentials.

Over and above this advantage, the process according to the invention enables the sealing at the site of the subsequent brazing of the conductor (wire or pin) on the metallized shoulder (9) to be distinctly improved by virtue of the very good adhesion of the metallization layer obtained during the phase of compressing the metallization paste onto the green sheet performed before the punching operation, and of the burying, between two ceramic layers, of the ring metallized over a portion of its surface. This configuration enables the peel strength of the metallization to be improved and, consequently, increases its resistance to traction forces and bending forces exerted on the brazed wire.

I claim:

1. A product produced by a process for manufacturing an insulating ceramic insert, said product comprising a ceramic body defined by two non-metallized end faces, an external lateral surface and at least one bore joining said two end faces, wherein said process comprises:

casting at least two plane sheets from a slip of insulating ceramic powder to obtain at least two green sheets, printing ring-shaped patterns, by silk screening, on at least one face of one of said green sheets with the aid of a conducting metallization ink or paste, performing a pressing operation on the silk-screen printed sheet, performing a punching operation on all said sheets to obtain a number of holes, each of said holes of said silk-screen printed sheet matching the interior of a ring of said ring-shaped patterns and having a diameter less than that of holes of the other sheets, stacking said sheets by bringing into coincidence the axes of the various holes, thereby obtaining said at least one bore, performing a pressing operation to agglomerate said sheets, performing a cutting-out operation around said at least one bore to obtain said external lateral surface and thereby fabricating at least one green insert, metallizing said at least one green insert on its external lateral surface, and performing a heat treatment to fire and sinter said insert.

2. A product produced by a process for manufacturing an insulating ceramic insert, said product comprising a ceramic body defined by two non-metallized end faces, an external lateral surface of any shape and at least one bore joining said two end faces, wherein said process comprises:

casting at least two plane sheets from a lip of insulating ceramic powder to obtain at least two green sheets, printing ring-shaped patterns, by silk-screening, on at least one face of one of said green sheets with the aid of a conducting metallization ink or paste, performing a pressing operation on the silk-screen printed sheet, performing a punching operation on all said sheets to obtain a number of holes, each of said holes of said silk-screen printed sheet matching the interior of a ring of said ring-shaped patterns and having a diameter less than that of holes of the other sheets, stacking said sheets by bringing into coincidence the axes of the various holes, thereby obtaining said at least one bore, performing a pressing operation to agglomerate said sheets, performing a cutting-out operation around said at least one bore to obtain said external lateral surface and thereby fabricating at least one green insert, performing a heat treatment to fire and sinter said insert, metallizing said sintered insert over its external lateral surface, and performing a lapping operation to remove the metallization from the end faces.

3. A product according to claim 1, wherein three green ceramic sheets are cast, the silk-screen printed sheet is thicker than the other two sheets and is silk-screen printed on its two faces, and, upon stacking, said silk-screen printed sheet is inserted between said other two sheets.

4. A product according to claim 1, wherein each of said green ceramic sheets is obtained by stacking several elementary green ceramic sheets.

5. A product according to claim 1, wherein each of the silk-screen printed patterns is a circular ring, the central circle of which corresponds to a bore of said insert.

6. A product according to claim 1, wherein upon stacking of said sheets, the ring-shaped patterns are partially covered.

7. A product according to claim 2, wherein three green ceramic sheets are cast, said silk-screen printed sheet is thicker than the other two sheets and is silk-screen printed on its two faces, and, upon stacking, said silk-screen printed sheet is inserted between said other two sheets.

8. A product according to claim 2, wherein each of said green ceramic sheets is obtained by stacking several elementary green ceramic sheets.

9. A product according to claim 2, wherein each of the silk-screen printed patterns is a circular ring, the central circle of which corresponds to a bore of said insert.

10. A product according to claim 2, wherein, upon stacking of said sheets, the ring-shaped patterns are partially covered.

11. An insulating ceramic insert, comprising a sintered ceramic body having two non-metallized end faces, a metallized external lateral surface, means defining at least one bore connecting said two end faces and being electrically insulated from said metallized external surface, said bore including a cylindrical central portion, at least one metallized shoulder positioned within said ceramic body and at least partially surrounding an end of said cylindrical central portion, said bore extending to at least one opening of a diameter greater than that of said cylindrical central portion and said at least one-opening providing access to said shoulder and to said cylindrical central portion.

12. An insulating ceramic insert according to claim 11, comprising at least two ceramic sheets.

13. An insulating ceramic insert according to claim 12, wherein one of said two sheets is provided with a silk-screen printed pattern.

14. An insulating ceramic insert according to claim 13, wherein said silk-screen printed sheet is thicker than the other sheet.

15. An insulating ceramic insert according to claim 11, comprising at least three ceramic sheets.

16. An insulating ceramic insert according to claim 15, wherein one of said sheets is provided with a silk-screen printed pattern on its two faces.

17. An insulating ceramic insert according to claim 16, wherein said silk-screen printed sheet is disposed between the other two sheets.

18. (Amended.) An insulating ceramic insert according to claim 13, wherein said silk-screen printed pattern comprises at least one circular ring having a central circle corresponding to said at least one bore of said insert.

19. An insulating ceramic insert according to claim 16, wherein said silk-screen printed pattern comprises at least one circular ring having a central circle corresponding to said at least one bore of said insert.

20. An insulating ceramic insert according to claim 18, wherein said silk-screen printed pattern is partially covered.

21. An insulating ceramic insert according to claim 19, wherein said silk-screen printed pattern is partially covered.

22. An insulating ceramic insert according to claim 12, wherein at least one of said ceramic sheets comprises several elementary ceramic sheets.

23. An insulating ceramic insert according to claim 15, wherein at least one of said ceramic sheets comprises several elementary ceramic sheets.

24. A product according to claim 1, wherein metallization of said green insert is selectively performed on said external lateral surface thereof.

25. A product according to claim 1, wherein metallization of said green insert is performed on the entire external surface and a lapping operation is subsequently performed to remove metallization from said end faces.

26. A product according to claim 2, wherein metallization of said green insert is selectively performed on said external lateral surface thereof.

27. A product according to claim 2, wherein metallization of said green insert is performed on the entire external surface and a lapping operation is subsequently performed to remove metallization from said end faces.

28. A product according to claim 1, wherein said product contains more than one bore adjoining said two end faces.

29. A product according to claim 2, wherein said product contains more than one bore adjoining said two end faces.

30. An insert according to claim 11, wherein said means defines more than one bore connecting said two end faces.

31. An insert according to claim 11, further comprising a conductor positioned within said bore and brazed to said at least one metallized shoulder.

* * * * *